United States Patent
Sugawara (10) Patent No.: US 12,457,423 B2
(45) Date of Patent: Oct. 28, 2025

(54) IMAGE CAPTURE APPARATUS CAPABLE OF DETECTING FLICKER, METHOD OF CONTROLLING SAME, AND STORAGE MEDIUM

(71) Applicant: CANON KABUSHIKI KAISHA, Tokyo (JP)

(72) Inventor: Atsushi Sugawara, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 119 days.

(21) Appl. No.: 18/503,760

(22) Filed: Nov. 7, 2023

(65) Prior Publication Data

US 2024/0073544 A1    Feb. 29, 2024

Related U.S. Application Data (62) Division of application No. 17/677,111, filed on Feb. 22, 2022, now Pat. No. 11,838,647.

(30) Foreign Application Priority Data

Feb. 22, 2021    (JP) ................. 2021-026642

(51) Int. Cl.
*H04N 23/745* (2023.01)
*H04N 23/67* (2023.01)

(52) U.S. Cl.
CPC .......... *H04N 23/745* (2023.01); *H04N 23/67* (2023.01)

(58) Field of Classification Search
CPC ...... H04N 23/745; H04N 23/67; H04N 23/63; H04N 23/54; H04N 23/55; G03B 13/34
See application file for complete search history.

(56) References Cited

U.S. PATENT DOCUMENTS

| 4,121,231 A | 10/1978 | Taguchi et al. |
| 2007/0052816 A1 | 3/2007 | Nomura et al. |
| (Continued) | | |

FOREIGN PATENT DOCUMENTS

| JP | H03258084 A | 11/1991 |
| JP | 2014066983 A | 4/2014 |
| (Continued) | | |

OTHER PUBLICATIONS

The above patent documents were cited in the Dec. 20, 2024 Chinese Office Action, a copy of which is enclosed without an English Translation, that issued in Chinese Patent Application No. 202210156699.5.

(Continued)

*Primary Examiner* — Gevell V Selby
(74) *Attorney, Agent, or Firm* — Cowan, Liebowitz & Latman, P.C.

(57) ABSTRACT

An image capture apparatus includes an image sensor that captures a subject image formed via a lens and outputs an image; and at least one processor or circuit configured to function as: a detection unit configured to detect flicker from the image output from the image sensor; and a control unit configured, in a case where, in an image capture time period in which images of a subject are being captured for flicker detection by the image sensor, the lens is driven in accordance with a drive operation that causes a change in an amount of light received by the image sensor, to adjust drive of the lens in the image capture time period.

5 Claims, 9 Drawing Sheets

(56) References Cited

U.S. PATENT DOCUMENTS

| | | |
|---|---|---|
| 2010/0171843 A1 | 7/2010 | Yamamoto |
| 2015/0256792 A1 | 9/2015 | Aoki |
| 2016/0366324 A1 | 12/2016 | Nakata |
| 2017/0041522 A1* | 2/2017 | Nakagawara ........ H04N 23/745 |
| 2019/0253604 A1* | 8/2019 | Noda ..................... H04N 25/44 |
| 2019/0289190 A1* | 9/2019 | Kunishige .............. H04N 23/73 |
| 2020/0007737 A1* | 1/2020 | Sugawara .............. H04N 23/72 |

FOREIGN PATENT DOCUMENTS

| | | |
|---|---|---|
| JP | 2016039596 A | 3/2016 |
| JP | 6053429 B2 | 12/2016 |
| JP | 2017-011352 A | 1/2017 |
| JP | 2018107826 A | 7/2018 |
| JP | 2020-014052 A | 1/2020 |
| JP | 2020010317 A | 1/2020 |
| JP | 2020-080512 A | 5/2020 |
| JP | 2020088667 A | 6/2020 |

OTHER PUBLICATIONS

The above foreign patent documents were cited in the Apr. 25, 2025 Japanese Office Action, a copy of which is enclosed with an English Translation, that issued in Japanese Patent Application No. 202210156699.5.

\* cited by examiner

|  |  | DETERMINATION RESULT OF FIG. 5A | |
|---|---|---|---|
|  |  | 100Hz | NOT 100Hz |
| DETERMINATION RESULT OF FIG. 5B | 120Hz | DC | 120Hz |
|  | NOT 120Hz | 100Hz | DC |

IMAGE CAPTURE APPARATUS CAPABLE OF DETECTING FLICKER, METHOD OF CONTROLLING SAME, AND STORAGE MEDIUM

CROSS-REFERENCE TO RELATED APPLICATION

This application is a divisional of application Ser. No. 17/677,111, filed Feb. 22, 2022, the entire disclosure of which is hereby incorporated by reference.

BACKGROUND OF THE INVENTION

Field of the Invention

The present invention relates to technology for detecting flicker in an image capture apparatus.

Description of the Related Art

With the increase in ISO values (increased sensitivity) in recent digital cameras, images are able to be captured with a high speed shutter even in conditions where there is an artificial light source that flickers. A high speed shutter has the advantage of enabling blur-free photos, such as photos of an indoor sport, to be captured, but when used to capture images in conditions where there is a flickering light source, in each frame or even within one frame, non-uniformity in exposure or color may appear in the images.

A known method to combat this including reducing the effects of flicker by detecting flicker and performing exposure at the flicker peak position where there is the least change in the amount of light.

To use such a method of reducing the effects of flicker, flicker and the frequency thereof needs to be detected. Known technology relating to the detection of flicker and the frequency thereof includes Japanese Patent Laid-Open No. 2017-11352, for example. In Japanese Patent Laid-Open No. 2017-11352, whether or not there is a flicker and the frequency of the flicker is determined by using, out of a plurality of photometric values obtained by performing photometry a plurality of times at fixed time intervals, a first evaluation value obtained from a photometric value acquired at a first interval close to the same phase of the flicker and a second evaluation value obtained from a photometric value acquired at a second interval close to the opposite phase of the flicker.

Also, in Japanese Patent Laid-Open No. 2020-80512, an image capture apparatus is described that enables a flicker detection operation to be performed during live view display without stopping the live view display.

However, the known technology described in Japanese Patent Laid-Open No. 2017-11352 is made on the assumption that, when image exposure is performed for flicker detection, only the brightness of the subject from the flicker light source will change and that other exposure conditions such as the aperture will not change. In a case where this assumed condition is not met, the flicker detection performance is decreased.

With the technology described in Japanese Patent Laid-Open No. 2020-80512, the exposure and the focus have to be constantly controlled to be in a preferable state for the user during the live view display. Thus, when a flicker detection operation is performed during the live view display, the flicker detection operation is affected by the changes in the exposure and focus during the live view display, and the image exposure conditions for flicker detection may change.

SUMMARY OF THE INVENTION

The present invention is made in light of the problems described above and is directed at providing an image capture apparatus capable of suppressing a reduction in detection accuracy when detecting flicker during live view display.

According to a first aspect of the present invention, there is provided an image capture apparatus, comprising: an image sensor that captures a subject image formed via a lens and outputs an image; and at least one processor or circuit configured to function as: a detection unit configured to detect flicker from the image output from the image sensor; and a control unit configured, in a case where, in an image capture time period in which images of a subject are being captured for flicker detection by the image sensor, the lens is driven in accordance with a drive operation that causes a change in an amount of light received by the image sensor, to adjust drive of the lens in the image capture time period.

According to a second aspect of the present invention, there is provided an image capture apparatus, comprising: an image sensor that captures a subject image formed via a lens and outputs an image; and at least one processor or circuit configured to function as: a detection unit configured to detect flicker from the image output from the image sensor; and a control unit configured, in a case where, in an image capture time period in which images of a subject are being captured for flicker detection by the image sensor, a drive operation of the lens is performed that causes a change in an amount of light received by the image sensor, to change a method for detecting flicker via the detection unit.

According to a third aspect of the present invention, there is provided a method of controlling an image capture apparatus provided with an image sensor that captures a subject image formed via a lens and outputs an image and a detection unit configured to detect flicker from the image output from the image sensor, comprising: controlling adjusting drive of the lens in an image capture time period in which images of a subject are being captured for flicker detection by the image sensor, in a case where, in the image capture time period, the lens is driven in accordance with a drive operation that causes a change in an amount of light received by the image sensor.

According to a fourth aspect of the present invention, there is provided a method of controlling an image capture apparatus provided with an image sensor that captures a subject image formed via a lens and outputs an image and a detection unit configured to detect flicker from the image output from the image sensor, comprising: controlling changing a method for detecting flicker via the detection unit in a case where, in an image capture time period in which images of a subject are being captured for flicker detection by the image sensor, a drive operation of the lens is performed that causes a change in an amount of light received by the image sensor.

Further features of the present invention will become apparent from the following description of exemplary embodiments with reference to the attached drawings.

DESCRIPTION OF THE EMBODIMENTS

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

The present invention is made in light of the problem of an image capture control operation (for example, driving a diaphragm in a lens, driving a focusing lens, driving a zoom lens) to change the amount of light (amount of light received by an image sensor) taken in from a lens causing a disruption in flicker detection. Hereinafter, the embodiments are described using an example in which the image capture control operation (driving operation of a lens component) that affects flicker detection is represented by the driving of a diaphragm of a lens. However, this is merely to facilitate understanding of the description. The image capture control operation is not limited to the driving a diaphragm of a lens, and similar methods can be used for other image capture control operations.

Also, in the embodiments, a digital mirrorless camera is used as an example of an image capture apparatus. However, the present invention is not limited thereto, and any one of various electronic devices with a camera function may be used. For example, the image capture apparatus according to the present invention may be a mobile communication terminal with a camera function, such as a mobile phone, a smart phone, or the like, a portable computer with a camera function, a portable game console with a camera function, or the like.

First Embodiment

Figure 1:
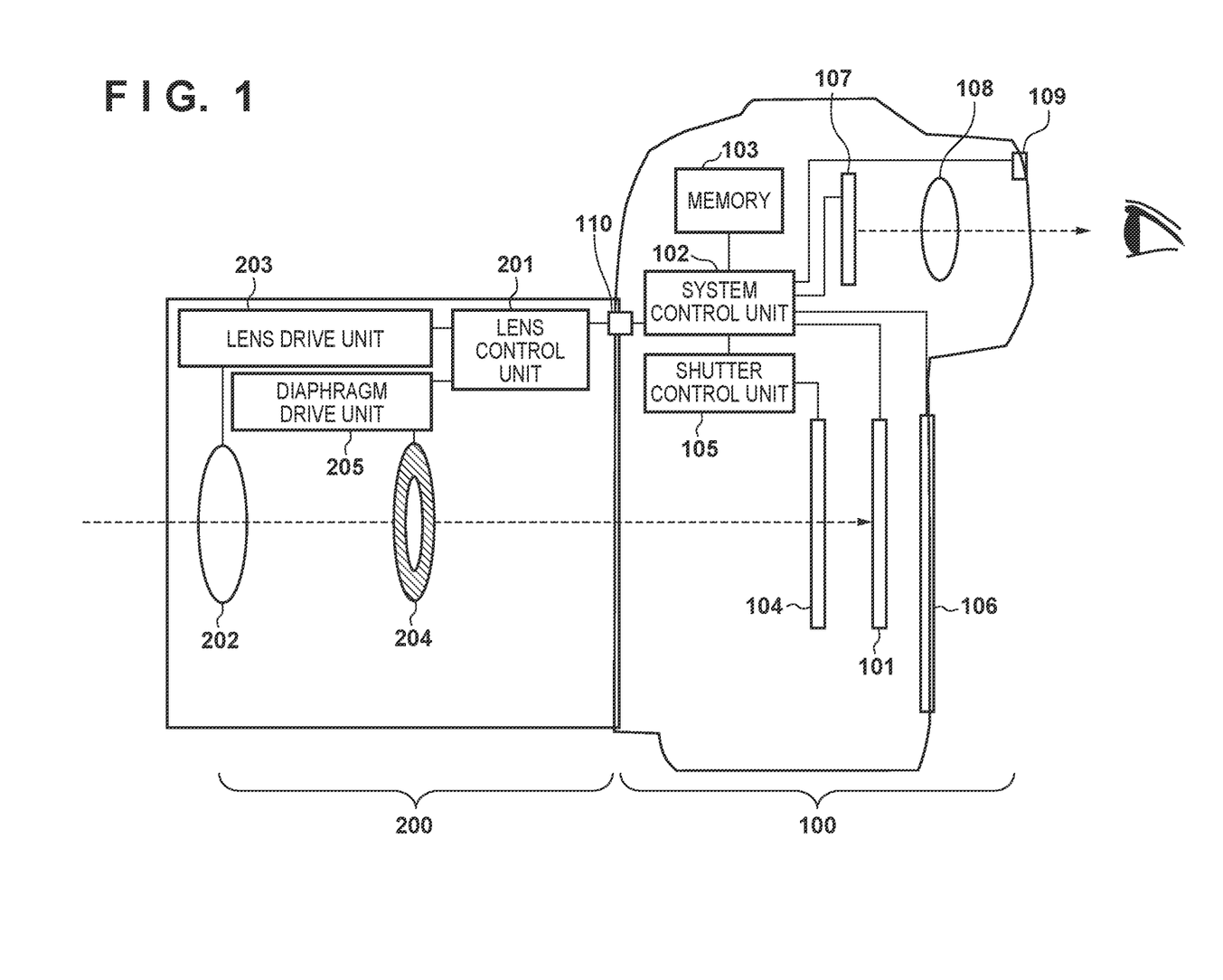
FIG. 1 is a diagram illustrating a schematic configuration of a digital mirrorless camera, which is an image capture apparatus according to a first embodiment of the present invention.

FIG. 1 is a diagram illustrating a schematic configuration of a digital mirrorless camera (hereinafter, referred to as a camera), which is the image capture apparatus according to the first embodiment of the present invention.

As illustrated in FIG. 1, the camera mainly includes a camera body 100 and an imaging lens 200, with the two being mechanically and electrically connected via a lens mount mechanism 110. Note that in the present embodiment, the imaging lens 200 for forming a subject image is configured to be detachable from the camera body 100, but in other embodiments may be integrally formed with the camera body 100.

Firstly, the camera body 100 will be described. An image sensor 101 is a CMOS or similar type of image sensor including a photoelectric conversion element and an infrared cut filter, low-pass filter, or the like. Photoelectric conversion is performed by the image sensor 101 on the optical image of the subject, and an image signal is output. When an image is not being captured, a shutter 104 closes and shields the image sensor 101 from light, and when a live view (LV) or an image is being captured, the shutter 104 opens and guides the incident light passing through the imaging lens 200 to the image sensor 101.

A system control unit 102 is an arithmetic processing device that controls the units of the camera body 100. A memory 103 includes a ROM that stores programs executed by the system control unit 102, variables, and the like and a RAM including a work area where programs are loaded by the system control unit 102 and/or a storage area for temporarily storing image data and the like.

Also, the system control unit 102 is connected to a lens control unit 201 via the lens mount mechanism 110. The lens control unit 201 controls the position of a focusing lens 202 via a lens drive unit 203. The lens control unit 201 also controls a diaphragm 204 via a diaphragm control unit 205. Specifically, control is executed by, from an image acquired at the image sensor 101, a calculation relating to AE/AF being performed at the system control unit 102, and the position and/or f-number of the focusing lens according to the calculation result being communicated to the lens control unit 201.

Also, the shutter 104 is also connected to the system control unit 102 via a shutter control unit 105, and the image sensor 101 is exposed to light for an exposure time corresponding to the calculation result obtained at the system control unit 102.

Next, the operation of displaying the image acquired at the image sensor 101 will be described. The operation described here includes image capture being continuously performed at the image sensor 101 and the captured image being displayed in real time on a display unit, to allow the user to observe the subject in a so-called live view mode.

There are two types of destinations for the display of the image captured at the image sensor 101, a rear monitor 106 and a finder display unit 107, and the image is displayed while switching between the two. This switching is performed on the basis of a detection result from an eye-proximity detection unit 109. Specifically, in a case where the user is detected to have their eye in close proximity, the image is displayed on the finder display unit 107. The user can then check the subject displayed on the finder display unit 107 via an eyepiece lens 108 by looking through the finder. In a case where the eye-proximity detection unit 109 detects that the user does not have their eye in close proximity, the image is displayed on the rear monitor 106.

Figure 2:
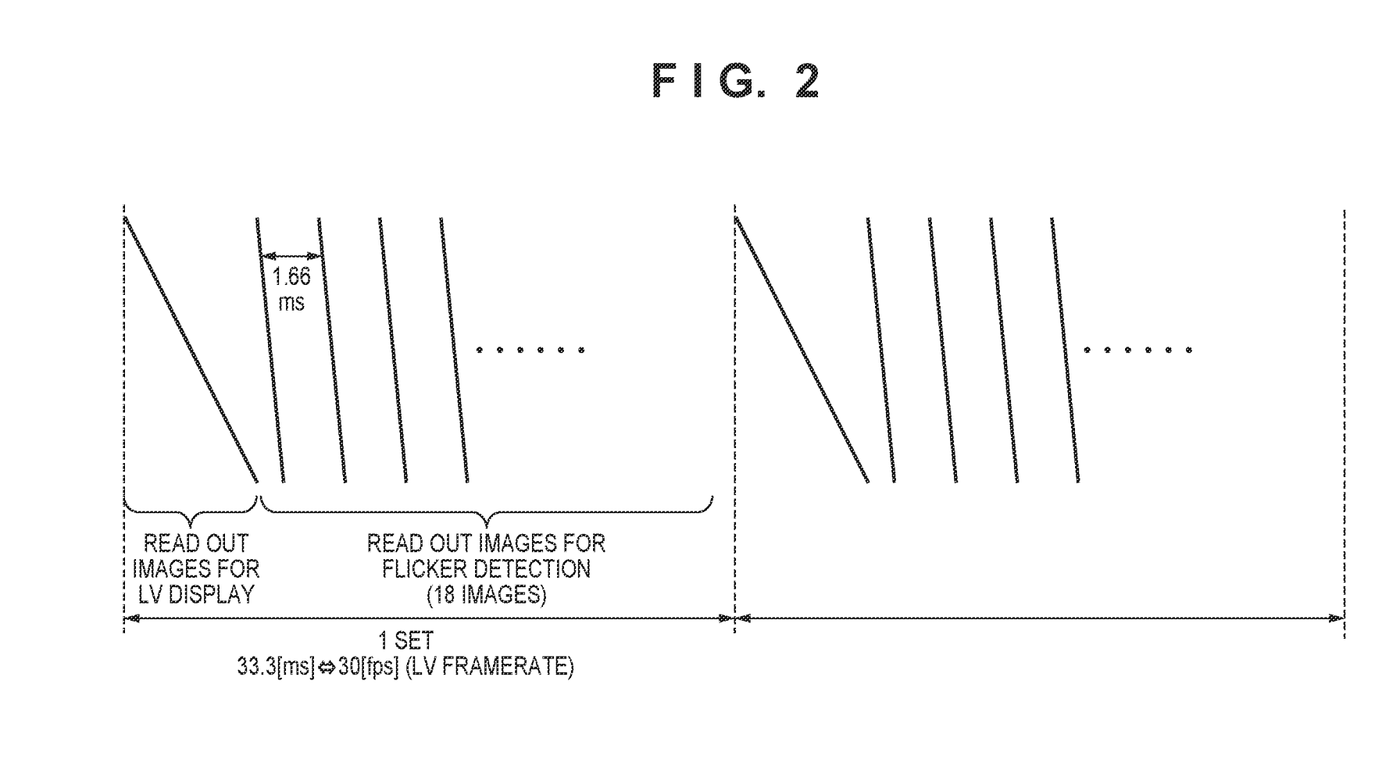
FIG. 2 is a diagram for describing how the image sensor is driven during live view.

Next, how the image sensor 101 is driven in live view mode will be described using FIG. 2. In FIG. 2, the horizontal direction represents time, the vertical direction represents the position of the image sensor 101 in the vertical direction, and the diagonal lines in the diagram represent read out timings of the image sensor 101 in live view mode. As illustrated in FIG. 2, first, a single image for live view display is read out, and then a plurality of images for flicker detection are read out (image capture time period for image for flicker detection). Acquiring the image for live view and the plurality of images for flicker detection is defined as one set, and the operation of one set is repeated.

The images for flicker detection are captured at intervals of 1.66 ms. One set is repeated every period of T (ms), thus making this period the frame rate of the live view display, i.e., 1/ T (fps). How many images for flicker detection can be acquired within one set is dependent on the period T (ms) of one set. If T (ms) is longer, the number of images for flicker detection that can be acquired is increased. In the present embodiment, the period of one set (the frame rate of the live view display) is 33.33 ms (30 fps), and the number of images for flicker detection that can be acquired within one set is eighteen.

Figure 3:
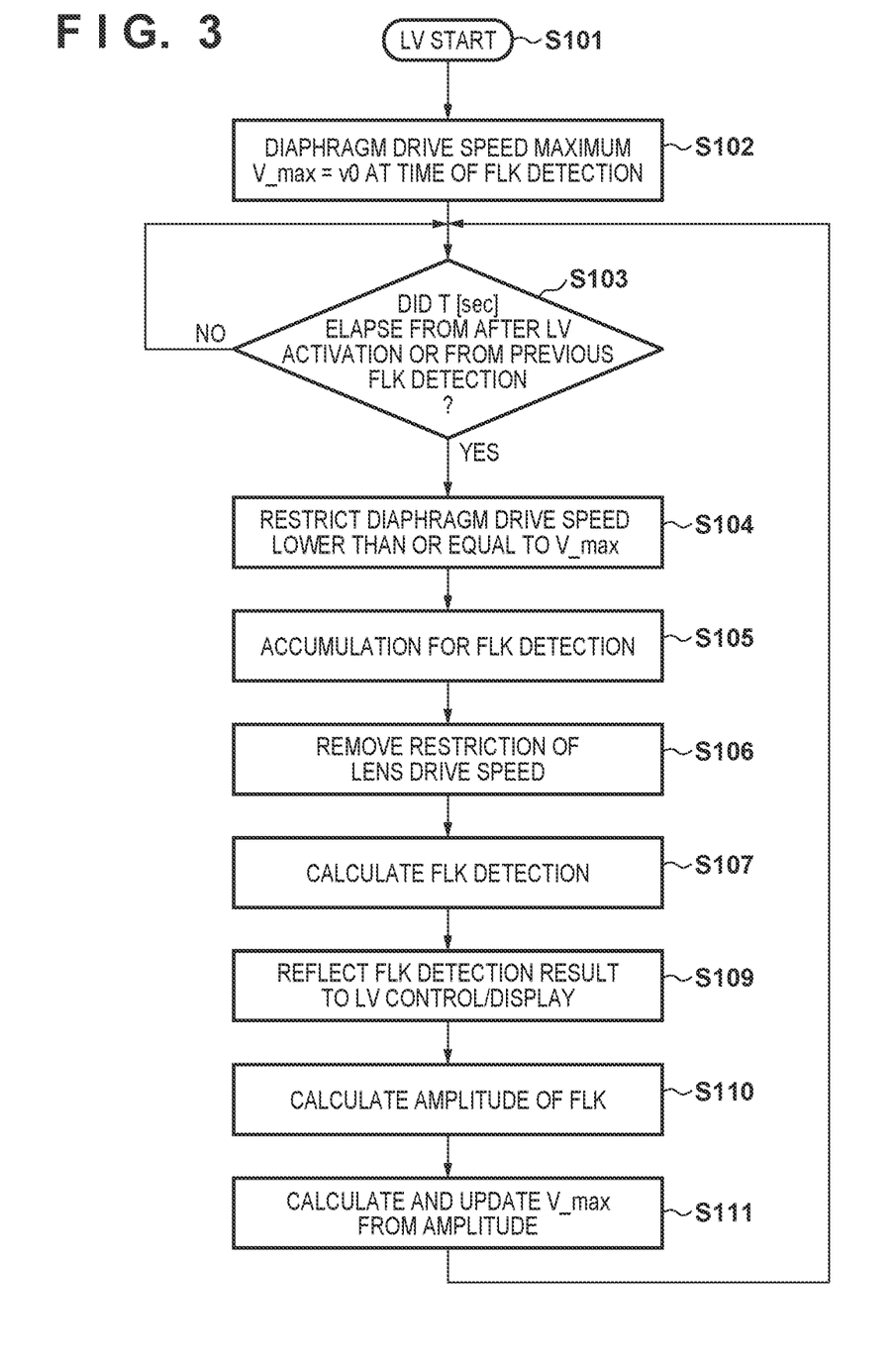
FIG. 3 is a flowchart illustrating flicker detection operations during live view in the first embodiment.

Next, the flicker detection operation during live view with a camera according to the present embodiment will be described using FIG. 3. The operations in the flowchart of FIG. 3 are implemented by the system control unit 102 loading, onto the RAM, a program/s stored in the ROM of the memory 103 and executing the program/s. Note that the operations in the flowchart of FIGS. 7 to 10 described below are similarly implemented by the system control unit 102 executing a program/s within the memory 103.

When a live view operation start instruction is received in step S101, the system control unit 102 firstly, in step S102, sets a maximum speed V_max of the diaphragm 204 drive speed when accumulation is performed for flicker detection to v0. Though described in more detail below, typically, when exposure is performed for the images for flicker detection, the flicker detection performance is reduced if the amount of light that enters from the lens changes due to driving the diaphragm. Also, the greater the diaphragm drive speed, the greater the reduction in performance. Thus, in step S102, in preparation for the first flicker detection operation after live view is started, the diaphragm 204 drive speed is set to the maximum value V_max.

Generally, the state of flicker in the image capture environment is determined by the illumination light in the environment. Thus, it is unlikely that the state of flicker, i.e., whether or not there is flicker and the frequency, changes rapidly. Accordingly, with the purpose of the first flicker detection being to reliably detect flicker, V_max is preferably set to a relatively slow speed. The maximum value for the diaphragm drive speed when performing the first flicker detection is set to v0. v0 is a predetermined value. However, for example, in a case where v0=0 holds true, driving of the diaphragm 204 is stopped when performing flicker detection, allowing for a highly accurate flicker detection to be achieved. After V_max is set, the system control unit 102 moves the process to step S103.

Step S103 is a step in which the time to perform flicker detection is waited for. As described above, because it is unlikely that the flicker state changes rapidly, it is excessive to perform the flicker detection operation every frame if calculation load and the like are taken into account. Instead, the flicker detection operation should be performed each time a predetermined time period elapses. Thus, in the present embodiment, the system control unit 102 performs flicker detection after live view is activated and thereafter repeatedly performs flicker detection every T seconds. In a case where T is set to 1, for example, flicker detection may be performed every 1 second. In step S103, the system control unit 102 determines whether or not the flicker detection timing has come. Then, only in a case where the flicker detection timing has come, the process moves to step S104 where the flicker detection operation is performed. Otherwise, the operation goes on standby and the normal live view display is continued.

Steps S104 to S107 are steps in which the flicker detection operation is actually performed. Firstly, in step S104, to accumulate the images for flicker detection, the system control unit 102 restricts (adjusts) the drive speed of the diaphragm 204 to the maximum speed V_max or less (the maximum value or less). After, the diaphragm drive speed is restricted, in step S105, the system control unit 102 causes the image sensor 101 to perform accumulation for flicker detection.

Figure 4A:
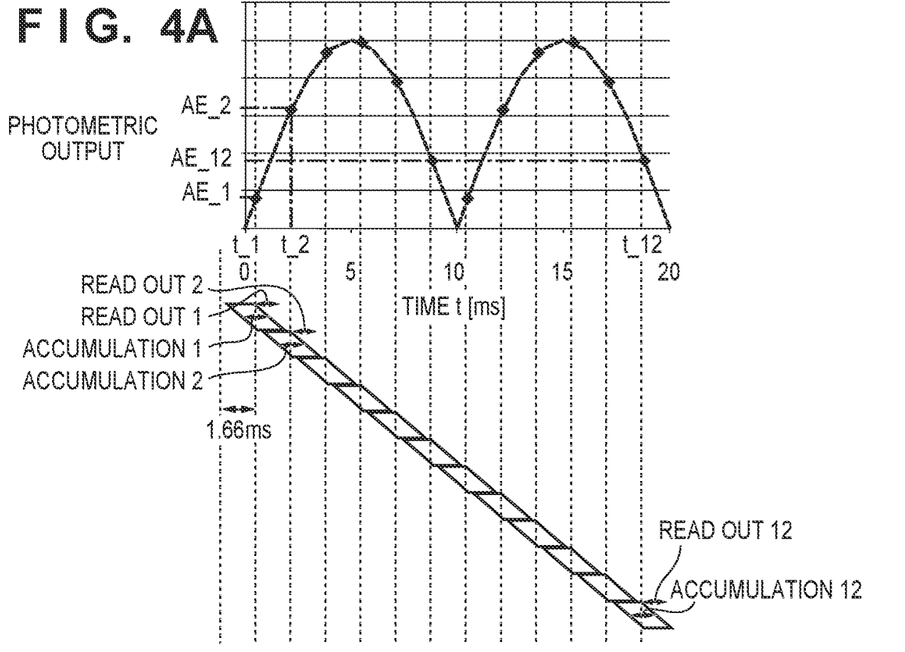
FIGS. 4A and 4B are diagrams illustrating the relationship between acquisition timings of images for flicker detection and photometric outputs.

FIG. 4A is a diagram illustrating the change over time of a signal value in a case where there is a flicker of 100 Hz when images for flicker detection are being accumulated. As described above using FIG. 2, in the present embodiment, the image sensor 101 is driven so that, after an image for live view display is read out, an image for flicker detection is read out eighteen times at intervals of 1.66 ms to form one set. For flicker detection, of the eighteen images captured at intervals of 1.66 ms, the first 12 images are used. Accumulation and reading out are performed for each one of the 12 images, and, as illustrated in the diagram, the n-th time accumulation is performed is represented by "Accumulation n", the signal read out of Accumulation n is represented by "read out n", and the photometric value (signal value) obtained from the result of read out n is represented by "AE_(n)". Herein, the first 12 times accumulation is performed will be focused on, with these resulting in the photometric values AE_1 to AE_12 being obtained. Also, because accumulation is performed over a limited amount of time, the central value (the position of the centroid of the parallelograms in the diagram) of the accumulation time period is used to represent the acquisition time of each photometric value and is representing by t_1 to t_12. In step S105, the system control unit 102 causes the image sensor 101 to acquire images for flicker detection at intervals of 1.66 ms in this manner.

After acquisition of the images for flicker detection is completed in step S105, in step S106, the system control unit 102 removes the restriction set in step S104 on the drive speed of the diaphragm 204. Then, in step S107, the system control unit 102 performs flicker detection calculations using AE_1 to AE_12.

In the flicker detection calculation, firstly, the system control unit 102 calculates an evaluation value from AE_1 to AE_12 to use in determining the frequency of the flicker. In the present embodiment, the evaluation value used in determining the frequency of the flicker is defined in the following formula.

$$SAD(m) = \sum_{i=1}^{6} |AE(n) - AE(n+m)|$$

SAD is an abbreviation for the sum of absolute difference and is a measure representing similarity that is used in fields such as pattern matching. m is a numerical value indicating from how many times forward is the photometric value that is used to calculate similarity with the photometric result AE_(n) of the n-th time, from among the 12 times photometry is performed. Thus, SAD(m) is a formula for calculating the similarity with the photometric value after (1.667×m) ms has elapsed. As can be seen from the formula, the higher the similarity, the lower the value for SAD(m).

For example, in an environment where there is a flicker of 100 Hz, because the flicker period is approximately 10 ms, and the relationship between the photometric period of 1.66 ms is 10÷1.66≈6. Thus, as illustrated in FIG. 4A, the same photometric value is obtained in periods of six, regardless of the accumulation timing. In other words, the relationship $AE\_(n) \approx AE\_(n+6)$ is satisfied. From this characteristic, calculating SAD_6 in an environment where there is a flicker of 100 Hz results in SAD_6≈0 holding true. Furthermore, to detect the presence of a flicker of 100 Hz, SAD_3 is also calculated. SAD_3 is a value obtained by calculating the similarity with a photometric value after 1.667×3=5 ms has elapsed. In an environment where there is a flicker of 100 Hz, because a photometric value of a 5 ms offset timing has an opposite phase relationship, SAD_3 is a value much larger than SAD_6. In other words, in a case where SAD_3 is a large value and SAD_6 is a small value, a flicker of 100 Hz may be considered to be present.

Figure 4B:
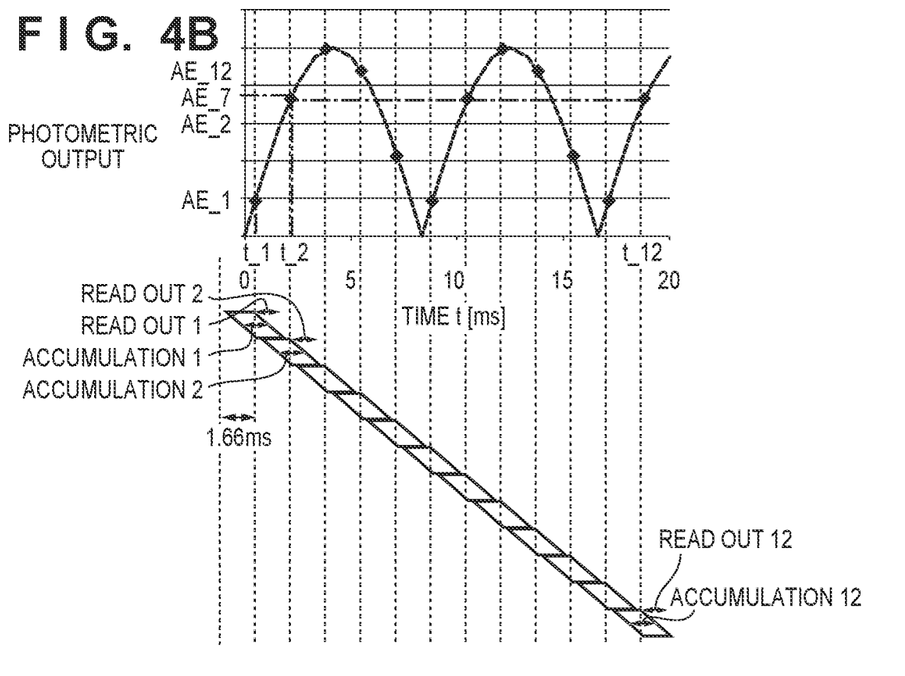

Using similar reasoning, in an environment in which there is a flicker of 120 Hz, SAD_5 and SAD_3 should be calculated. In an environment where there is a flicker of 120 Hz, the light source on period is 8.333 ms. Thus, as illustrated in FIG. 4B, $AE\_(n) \approx AE\_(n+5)$ and SAD_5≈0 hold true. Also, with a flicker of 120 Hz, a perfectly opposite phase relationship is obtained at 4.16 ms, and thus ideally, similarity is determined with the waveform after 4.16 ms has elapsed. However, 4.16 ms is not a multiple of the frame period of 1.667 ms. Thus, as a relatively close value, the value of SAD_3 indicating the similarity with the waveform after 5 ms has elapsed is used instead. Even in an environment where there is a flicker of 120 Hz, because SAD_3 represents a similarity close to the opposite phase, SAD_3 is a value much larger than SAD_5.

From the foregoing, SAD_6, SAD_5, and SAD_3 are calculated, and, using these, a final flicker frequency determination is performed. As described above, in an environment where there is a flicker of 100 Hz, SAD_3 is a value much larger than SAD_6. Thus, looking at the plane illustrated in FIG. 5A with SAD_3 on the horizontal axis and SAD_6 on the vertical axis, in an environment where there is a flicker of 100 Hz, the plot in the relatively lower-right region of the plane is obtained. In other words, by dividing the regions as illustrated in FIG. 5A and setting a region for determining that the flicker is 100 Hz and a region for determining that the flicker is not 100 Hz, whether or not there is a flicker of 100 Hz can be determined with high accuracy from the plot position.

Figure 5A:
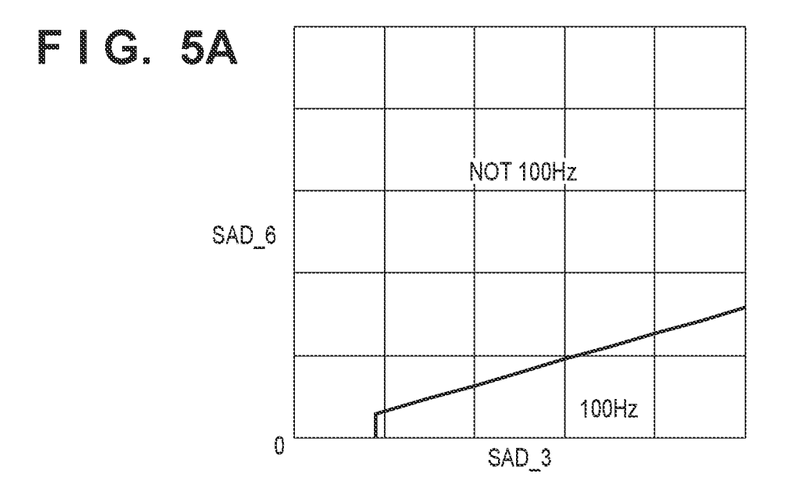
FIGS. 5A to 5C are diagrams illustrating a method for determining whether or not there is a flicker.
Figure 5B:
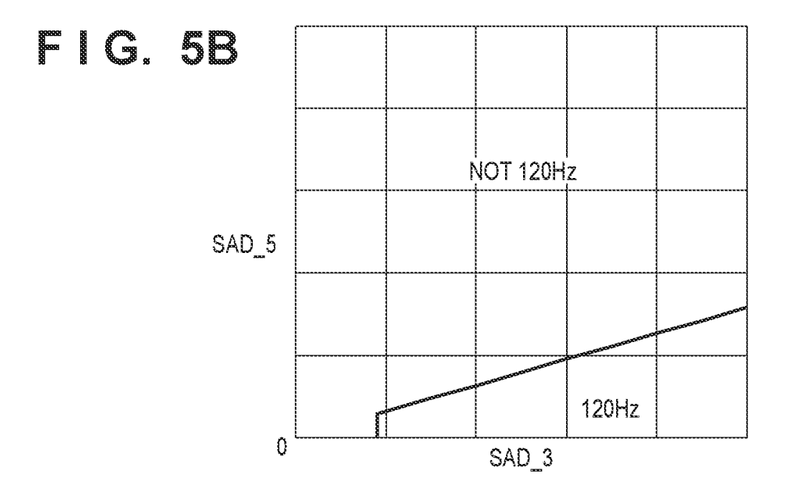

In a similar manner, by dividing the regions of the plane illustrated in FIG. 5B with SAD_3 on the horizontal axis and SAD_5 on the vertical axis, whether or not there is a flicker of 120 Hz can be determined.

Note that the region dividing lines illustrated in FIGS. 5A and 5B are merely examples, and the gradient and bend points are not limited thereto.

Whether or not there is a flicker of 100 Hz can be determined from the plot position of the plane illustrated in FIG. 5A and whether or not there is a flicker of 120 Hz can be determined from the plot position of the plane illustrated in FIG. 5B. Then, finally, processing to merge the determination results is executed.

Figure 5C:
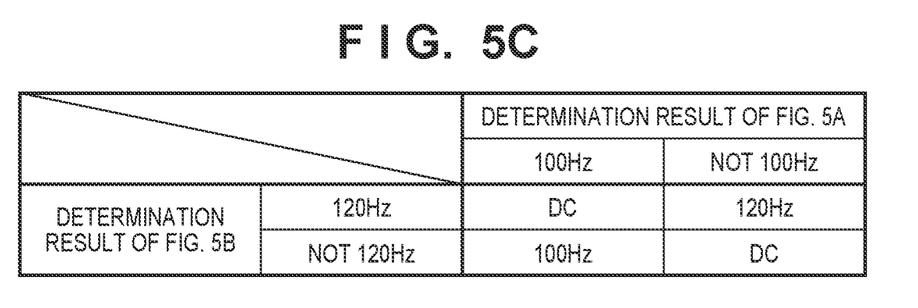

The merge processing is executed on the basis of the table illustrated in FIG. 5C. The table will be described below. In a case where there is a flicker of 100 Hz, the determination result of FIG. 5A is "100 Hz" and the determination result of FIG. 5B is "not 120 Hz". Thus, the box in the lower left of FIG. 5C is "100 Hz". Via similar reasoning, the box in the upper right of FIG. 5C is "120 Hz".

In a case where there is no flicker and the subject is in a constant DC-generated light, for example, because the photometric value does not change over time $$AE\_1 \approx AE\_2 \approx AE\_3 \approx \ldots \approx AE\_12$$

holds true. And thus, $$SAD\_6 \approx SAD\_5 \approx SAD\_3 \approx 0$$

holds true. In other words, in a DC environment, a plot close to the origin point of the plane of both FIG. 5A and FIG. 5B is obtained, with the determination result of FIG. 5A being "not 100 Hz", and the determination result of FIG. 5B being "not 120 Hz". Thus, the lower right box in the table of FIG. 5C indicates a determination of DC causing no change in brightness.

Also, the upper left box of the table of FIG. 5 represents a case where the result is "100 Hz" and "120 Hz". Such a determination result can normally be considered unlikely to be obtained. However, such a result may be obtained due to the subject being captured not being the same across AE_1 to AE_12 due to the subject moving, a panning operation, or the like. Thus, in such a case, a determination of DC is obtained indicating a flicker detection error. In this manner, in step S107, the system control unit 102 determines whether there is a flicker and the frequency of the flicker.

Figure 6:
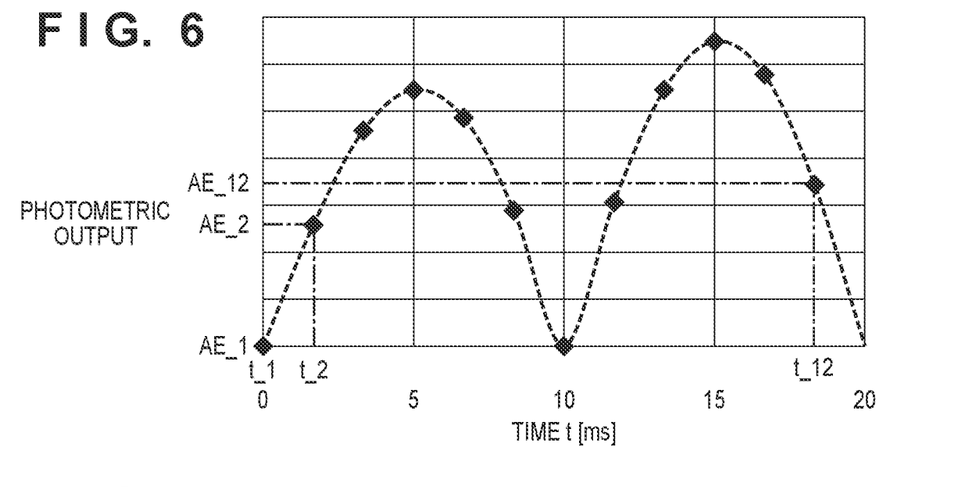
FIG. 6 is a diagram illustrating photometric outputs when a diaphragm is driven when performing accumulation of images for flicker detection.

Above, flicker detection calculations in an ideal case where a flicker is present have been described. However, next, a case will be described in which, during accumulation of the images for flicker detection, the diaphragm 204 is driven and opened. FIG. 6 is a diagram illustrating an example of a photometric output in a case where accumulation for flicker detection is performed 12 times in an environment where there is a flicker of 100 Hz and the diaphragm is opening.

In a photometric output such as that illustrated in FIG. 6, $AE\_(n) \leq AE\_(n+6)$ holds true, the SAD_6≈0 expected in an environment where there is a flicker of 100 Hz does not hold true, and SAD_6>0 holds true. The higher the speed at which the diaphragm 204 is driven, the larger the value for SAD_6. In other words, as illustrated in FIG. 5A, the points that should be in the region for determination as 100 Hz are instead made points in a region formed by SAD_6 being greater than 0 due to the drive speed of the diaphragm, thus making it possible for not 100 Hz to be determined. This phenomenon also happens in regard to SAD_5 in an environment where there is a flicker of 120 Hz.

However, larger amplitudes of the flicker to be detected result in larger values for SAD_3. As seen in FIGS. 5A to 5C, the boundary of the flicker determination region is running upward to the right, thus even if the diaphragm 204 is driven and SAD_6>0 holds true, the larger the amplitude of the flicker, the less probability that a determination error will occur. In other words, it can be seen that with a flicker with a large amplitude, erroneous determination is unlikely even if the lens diaphragm is driven at relatively high speeds.

After the flicker detection calculations of step S107 are complete, the system control unit 102 moves the process to step S109 and changes the live view display operation in accordance with the detected flicker. In an environment where there is a flicker, by setting the accumulation time for acquiring images to a multiple of the flicker period, line flicker can be prevented from appearing in a captured image. Thus, in step S109, the system control unit 102 controls the accumulation time of an image for live view display in accordance with the flicker detection result.

In steps S110 to S111, the system control unit 102 calculates the amplitude of the flicker and determines the maximum value V_max of the diaphragm 204 drive speed for the next accumulation for flicker detection in accordance with the calculation result.

As described above, with a flicker with a large amplitude, erroneous determinations are unlikely even if the diaphragm 204 is driven at relatively high speeds. Thus, the amplitude of the flicker is obtained from the difference between the maximum value and the minimum value of AE_1 to AE_12 in FIGS. 4A and 4B, and V_max is determined in accordance with the obtained amplitude. Thereafter, the process returns to step S103, and the system control unit 102 repeats live view display. Accordingly, in an environment where there is a flicker with a large amplitude, the maximum value V_max of the drive speed of the diaphragm 204 can be set to a relatively large value. Thus, unnecessary restrictions on the drive speed of the diaphragm are avoided, and detection errors can be prevented even in an environment where there is a flicker with a smaller amplitude.

Second Embodiment

Figure 7:
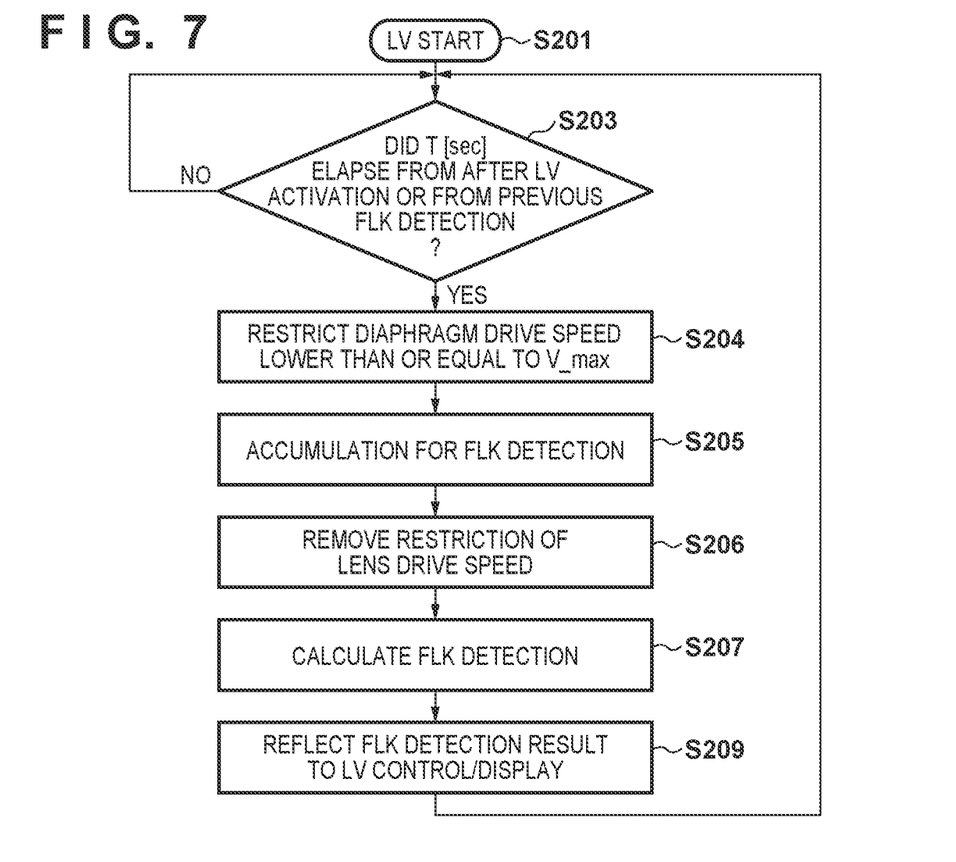
FIG. 7 is a flowchart illustrating flicker detection operations during live view in a second embodiment.

Next, the flicker detection operation during live view of a camera according to the second embodiment will be described using FIG. 7. Note that the configuration of the camera body 100 and the method of driving the image sensor 101 when in live view mode are similar to that described in the first embodiment using FIGS. 1 and 2, and thus description thereof is omitted.

In the flowchart of FIG. 3 according to the first embodiment, the amplitude of the flicker is detected, and the maximum value V_max of the drive speed of the diaphragm is updated in accordance with the amplitude. In the present embodiment, more simply, a fixed predetermined value is set as V_max regardless of the amplitude of the flicker. In other words, in steps S201 to S209 of FIG. 7 illustrating the present embodiment, the steps S102, S110, S111 of FIG. 3 are omitted, and V_max is a fixed value. In this manner, a good balance between flicker detection accuracy and exposure control of live view display can be achieved via very simple control.

Third Embodiment

Figure 8:
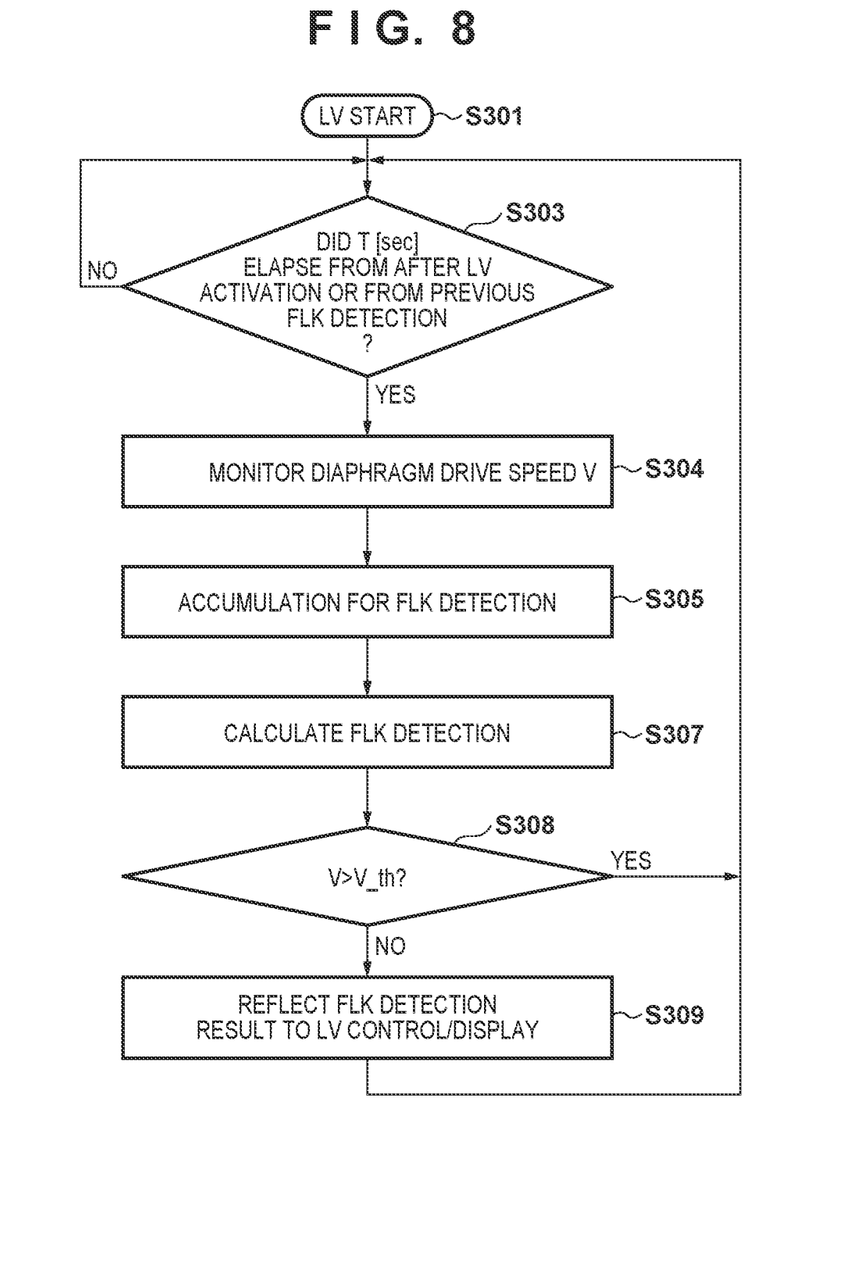
FIG. 8 is a flowchart illustrating flicker detection operations during live view in a third embodiment.

Next, the flicker detection operation during live view of a camera according to the third embodiment will be described using FIG. 8. Note that the configuration of the camera body 100 and the method of driving the image sensor 101 when in live view mode are similar to that described in the first embodiment using FIGS. 1 and 2, and thus description thereof is omitted.

It is rare for the diaphragm 204 to constantly move at high speeds during live view. Accordingly, flicker detection results of when the diaphragm is moving at high speeds can solely be discarded due to having low reliability and instead the period T of flicker detection can be shortened, while causing no large problems overall. In the third embodiment, on the basis of this reasoning, a flicker detection operation such as that illustrated in FIG. 8 is performed.

Steps S301 and S303 are similar to steps S101 and S103. In step S304, the system control unit 102 starts monitoring a drive speed V of the diaphragm. In steps S305 and S307, as in steps S105 and S107, accumulation and calculation for flicker detection are performed. Thereafter, in step S308, the system control unit 102 determines the drive speed of the monitored diaphragm. In other words, it is determined whether or not the drive speed V of the monitored diaphragm is a higher speed than a predetermined fixed threshold V_th during the time period of accumulation for flicker detection in step S305. Then, in a case where the drive speed V is a higher speed than the threshold V_th, the flicker detection result of step S307 is determined to be unreliable, and the process returns to step S303. On the other hand, in a case where V is equal to or less than the threshold V_th (equal to or less than the threshold), the system control unit 102 uses (selects) the flicker detection result of step S307 and, in accordance with this result, controls the live view display in step S309. Thereafter, the process returns to step S303.

In this manner, flicker detection error can be suppressed by evaluating the reliability of the flicker detection result on the basis of the diaphragm drive speed during the time period of accumulation for flicker detection in step S305.

Fourth Embodiment

Figure 9:
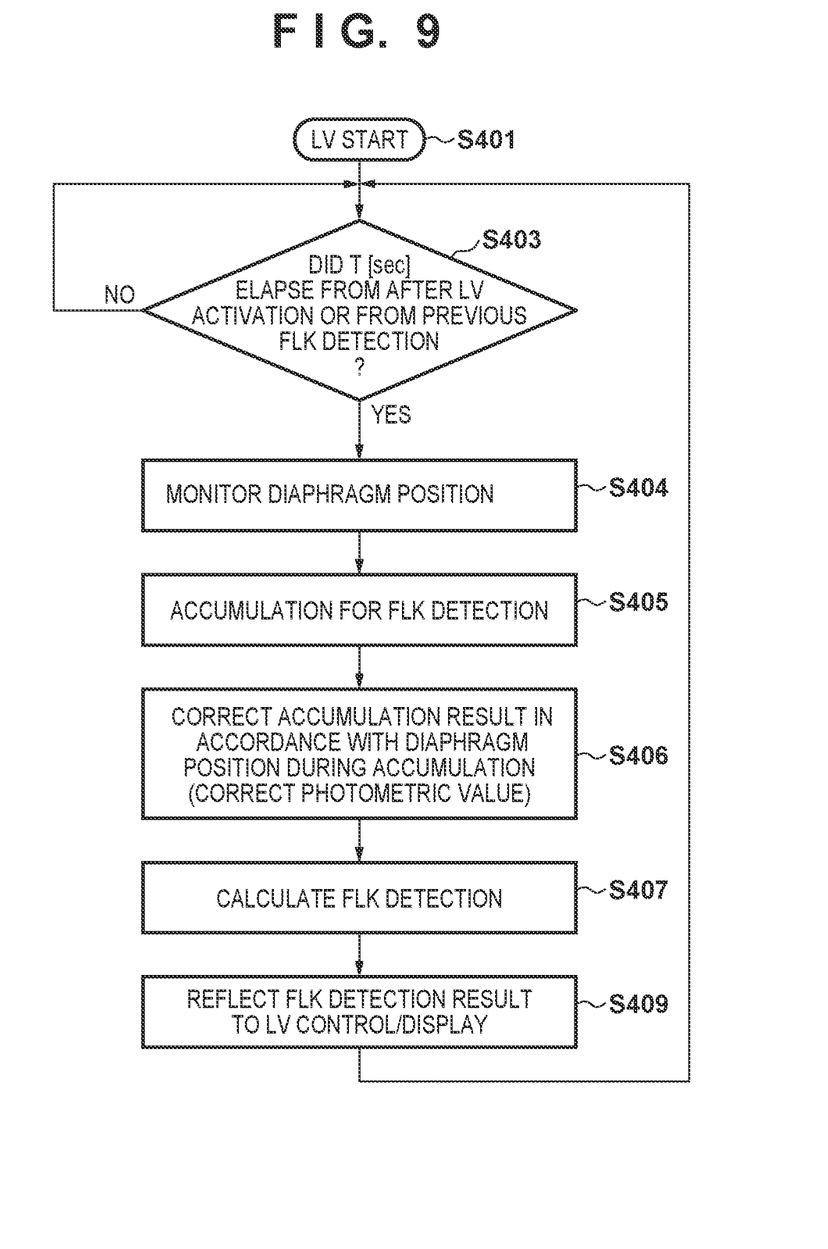
FIG. 9 is a flowchart illustrating flicker detection operations during live view in a fourth embodiment.

Next, the flicker detection operation during live view of a camera according to the fourth embodiment will be described using FIG. 9. Note that the configuration of the camera body 100 and the method of driving the image sensor 101 when in live view mode are similar to that described in the first embodiment using FIGS. 1 and 2, 8 and thus description thereof is omitted.

Steps S401 and S403 are similar to steps S101 and S103. In step S404, the system control unit 102 starts monitoring the diaphragm position of the diaphragm 204 and, in step S405, acquires images for flicker detection. In step S405, for example, accumulation and read out are performed 12 times while driving the diaphragm 204 in the open direction to obtain photometric values AE_1 to AE_12 such as those illustrated in FIG. 6. However, because monitoring of the diaphragm position is started in step S404, the diaphragm position at the points in time t_1 to t_12, which correspond to the time of the 12 times of accumulation, can be identified. Also, on the basis of this, the photometric values AE_1 to AE_12 can be corrected. For example, a value for AE_1 to AE_12 with the effects of diaphragm drive removed can be obtained by, using the diaphragm position at t_1 as a reference, adding the difference in the amount of light calculated from the relative positions of the diaphragm at points in time t_2 to t_12 as is to AE_2 to AE_12. As a result, even in the case of values such as those illustrated in FIG. 6, the AE_1 to AE_12 actually obtained can be corrected to photometric values such as those of AE_1 to AE_12 in FIG. 4A via correction based on the diaphragm position.

Steps S407 and S409 are similar to steps S107 and S109, and thus description thereof is omitted.

According to the operations described above, in the present embodiment, even in a case where the diaphragm is driven during accumulation of images for flicker detection, a good balance between flicker detection performance and exposure control of live view display can be achieved.

Fifth Embodiment

In the first to fourth embodiments, SAD_6, SAD_5, and SAD_3 are calculated from the 12 images for flicker detection acquired at intervals of 1.66 ms and, using the evaluation values thereof, flicker detection is performed. For convenience of description, this is referred to as a first flicker detection method.

In the present embodiment, in addition to the first flicker detection method, a second flicker detection method that is relatively resistant to disruption during accumulation for flicker detection is used, and the flicker detection method in use is switched depending on the drive speed of the diaphragm 204 during accumulation for flicker detection.

The second flicker detection method will now be described. In the second flicker detection method, an image for live view display is used as is for flicker detection. In an image captured by a rolling shutter type of image sensor, the timing of the start and end of exposure is different for each horizontal line. In other words, in an environment where there is a flicker, an image with different brightness for each horizontal line is obtained, and a stripe pattern is observed. In order to extract the flicker component from the stripe pattern, a signal component that is steady in the time direction is extracted via the following formula.

$$\text{mem} = \text{ave} \times k + \text{mout} \times (19-k)$$

Here, mem is a value stored in the memory as the output of the formula, ave is a signal value of a color component of each row within the input image, k is a filter coefficient of a cyclic low-pass filter, and mout is a calculation result of the formula calculated when the signal value of the image of 1 frame before is input.

A signal component that is steady in the time direction can be extracted by performing the calculation described above on each horizontal line of the input image. A flicker component (level variation component of the input image signal) is calculated by dividing the signal value of the horizontal line of the newly image by the extracted steady signal component. A flicker model of the variation characteristics of the vertical direction signal level is generated from the calculated flicker component. The flicker model can be approximated as a periodic function having a specific amplitude w, a frequency f, and a phase θ in the vertical direction. Because the voltage variation in the AC power supply that drives the light source has the properties of a trigonometric function, a sine wave (or a cosine wave) is typically used as the periodic function for modelling, but it is also possible to use another periodic ideal function. The frequency f is determined using the frame rate and the power supply frequency of the light source. Also, regarding the phase θ, the phase of each row can be calculated by setting the row with, from among the detected variation components, a variation ratio of 1 and a change amount of the variation rate in the vertical direction of 1 so that the phase θ=0. Furthermore, the amplitude w is calculated from the variation ratio with the calculated phase of $\pi/2$ and $3\pi/2$.

Such a method places more emphasis on the frequency component and has a characteristic of being able to perform detection in a stable manner that is more accommodating to changes in brightness caused by driving of the diaphragm 204 compared to the first flicker detection method. However, because information of stripes caused by using a rolling shutter is used, finding a flicker in only one portion of the screen is difficult. Also, in order to obtain a stable detection result, an image with multiple frames is necessary, meaning that a characteristic of the method is that performing detection one time takes a long time.

However, the first flicker detection method uses photometric values of a narrowed target region. Thus, flicker detection can be performed in only one region of the screen. Furthermore, the amount of time taken for detection is only the amount of time needed to capture 12 images at intervals of 1.66 ms, i.e., a very short time of approximately 20 ms. In the fifth embodiment, the first and second flicker detection methods with different characteristics used depending on the situation.

Figure 10:
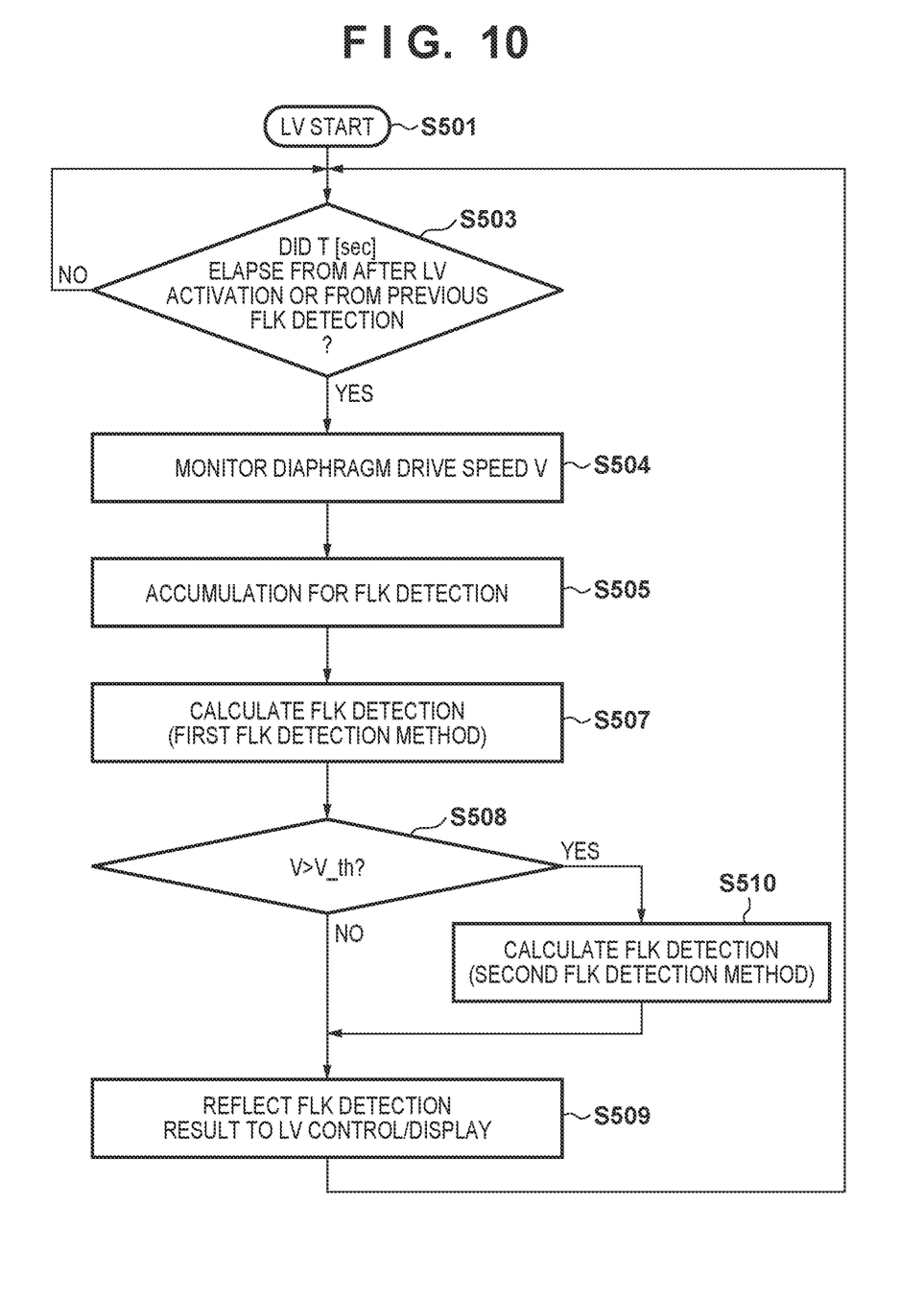
FIG. 10 is a flowchart illustrating flicker detection operations during live view in a fifth embodiment.

FIG. 10 is a flowchart illustrating the operations of the present embodiment. Steps S501 and S509 are similar to steps S301 and S309 of the third embodiment. However, in step S308, in a case where the diaphragm drive speed V during accumulation for flicker detection is a higher speed than the predetermined fixed threshold V_th, the detection result is discarded in the third embodiment. Instead of this, in the present embodiment, even in a case where the diaphragm drive speed V is a higher speed than the threshold V_th, by performing the second flicker detection in step S510, a flicker detection unaffected by the diaphragm driving can be achieved.

Other Embodiments

Embodiment(s) of the present invention can also be realized by a computer of a system or apparatus that reads out and executes computer executable instructions (e.g., one or more programs) recorded on a storage medium (which may also be referred to more fully as anon-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-026642, filed Feb. 22, 2021 which is hereby incorporated by reference herein in its entirety.

What is claimed is:

1. An image capture apparatus, comprising:
an image sensor that captures a subject image formed via a lens and outputs an image; and
at least one processor or circuit configured to function as:
a detection unit configured to detect flicker from the image output from the image sensor; and
a control unit configured, in a case where, in an image capture time period in which images of a subject are being captured for flicker detection by the image sensor, a drive operation of the lens is performed that causes a change in an amount of light received by the image sensor, to change a method for detecting flicker via the detection unit, wherein the control unit switches between a first method for detecting flicker in which flicker is detected using a plurality of images for flicker detection and a second method for detecting flicker in which flicker is detected using an image for live view, and wherein the control unit selects the first method in a case where a drive speed of a diaphragm of the lens is equal to or less than a predetermined threshold and selects the second method in a case where the drive speed is higher than the predetermined threshold.

2. The image capture apparatus according to claim 1, wherein the detection unit detects whether or not there is a flicker, and a frequency of a flicker.

3. The image capture apparatus according to claim 1, wherein the drive operation causes at least one lens driving from among driving a diaphragm in the lens, driving a focusing lens, and driving a zoom lens to be performed.

4. A method of controlling an image capture apparatus provided with an image sensor that captures a subject image formed via a lens and outputs an image and a detection unit configured to detect flicker from the image output from the image sensor, comprising:

controlling changing a method for detecting flicker via the detection unit in a case where, in an image capture time period in which images of a subject are being captured for flicker detection by the image sensor, a drive operation of the lens is performed that causes a change in an amount of light received by the image sensor, wherein the controlling switches between a first method for detecting flicker in which flicker is detected using a plurality of images for flicker detection and a second method for detecting flicker in which flicker is detected using an image for live view, and wherein the controlling selects the first method in a case where a drive speed of a diaphragm of the lens is equal to or less than a predetermined threshold and selects the second method in a case where the drive speed is higher than the predetermined threshold.

5. A non-transitory computer-readable storage medium storing a program for causing a computer to execute a method of controlling an image capture apparatus provided with an image sensor that captures a subject image formed via a lens and outputs an image and a detection unit configured to detect flicker from the image output from the image sensor, the method comprising:

controlling changing a method for detecting flicker via the detection unit in a case where, in an image capture time period in which images of a subject are being captured for flicker detection by the image sensor, a drive operation of the lens is performed that causes a change in an amount of light received by the image sensor, wherein the controlling switches between a first method for detecting flicker in which flicker is detected using a plurality of images for flicker detection and a second method for detecting flicker in which flicker is detected using an image for live view, and wherein the controlling selects the first method in a case where a drive speed of a diaphragm of the lens is equal to or less than a predetermined threshold and selects the second method in a case where the drive speed is higher than the predetermined threshold.

* * * * *